United States Patent
Pan

(10) Patent No.: US 7,936,807 B2
(45) Date of Patent: *May 3, 2011

(54) METHOD AND APPARATUS FOR REDUCING THE PROCESSING RATE OF A CHIP-LEVEL EQUALIZATION RECEIVER

(75) Inventor: Jung-Lin Pan, Smithtown, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/535,010

(22) Filed: Aug. 4, 2009

(65) Prior Publication Data

US 2009/0316765 A1    Dec. 24, 2009

Related U.S. Application Data

(63) Continuation of application No. 11/824,792, filed on Jul. 2, 2007, now Pat. No. 7,573,963, which is a continuation of application No. 11/515,169, filed on Sep. 1, 2006, now Pat. No. 7,257,152, which is a continuation of application No. 11/210,591, filed on Aug. 24, 2005, now Pat. No. 7,116,705.

(60) Provisional application No. 60/625,870, filed on Nov. 8, 2004.

(51) Int. Cl.
 *H04B 1/00* (2006.01)
 *H04L 1/02* (2006.01)

(52) U.S. Cl. .................................. 375/148; 375/347

(58) Field of Classification Search .................. 375/130, 375/140, 147, 148, 150, 152, 259, 260, 267, 375/316, 346, 347; 370/310, 320, 335, 328, 370/329, 342, 441, 334
See application file for complete search history.

(56) References Cited

U.S. PATENT DOCUMENTS

| | | | |
|---|---|---|---|
| 5,719,899 | A | 2/1998 | Thielecke et al. |
| 6,097,712 | A | 8/2000 | Secord et al. |
| 6,154,487 | A | 11/2000 | Murai |

(Continued)

FOREIGN PATENT DOCUMENTS

CN    1332544 A    1/2002

(Continued)

OTHER PUBLICATIONS

Krauss et al., "Oversampling Diversity versus Dual Antenna Diversity for Chip-Level Equalization on CDMA Downlink," Proceedings of the 2000 Sensor Array and Multichannel Signal Processing Workshop, pp. 47-51 (2000).

(Continued)

*Primary Examiner* — David C Payne
*Assistant Examiner* — Vineeta S Panwalkar
(74) *Attorney, Agent, or Firm* — Volpe and Koenig, P.C.

(57) ABSTRACT

A method and apparatus for reducing the processing rate when performing chip-level equalization (CLE) in a code division multiple access (CDMA) receiver which includes an equalizer filter. Signals received by at least one antenna of the receiver are sampled at M times the chip rate. Each sample stream is split into M sample data streams at the chip rate. Multipath combining is preferably performed on each split sample data stream. The sample data streams are then combined into one combined sample data stream at the chip rate. The equalizer filter performs equalization on the combined sample stream at the chip rate. Filter coefficients are adjusted by adding a correction term to the filter coefficients utilized by the equalizer filter for a previous iteration.

9 Claims, 5 Drawing Sheets

U.S. PATENT DOCUMENTS

| | | |
|---|---|---|
| 6,175,588 B1 | 1/2001 | Visotsky |
| 6,272,168 B1 | 8/2001 | Lomp |
| 6,377,613 B1 | 4/2002 | Kawabe et al. |
| 6,430,235 B1 | 8/2002 | O'Shea et al. |
| 6,563,859 B1 | 5/2003 | Oishi et al. |
| 6,690,715 B2 | 2/2004 | Webster et al. |
| 6,700,924 B1 | 3/2004 | Marzouki |
| 6,947,403 B2 | 9/2005 | Heikkila et al. |
| 2001/0014114 A1 | 8/2001 | Baltersee et al. |
| 2003/0050020 A1 | 3/2003 | Erceg et al. |
| 2004/0008759 A1 | 1/2004 | Yang |
| 2004/0042537 A1 | 3/2004 | Frank |
| 2004/0109419 A1 | 6/2004 | Sano et al. |
| 2004/0116077 A1 | 6/2004 | Lee et al. |
| 2005/0243955 A1 | 11/2005 | Mondragon-Torres et al. |
| 2006/0114974 A1 | 6/2006 | Zeira et al. |

FOREIGN PATENT DOCUMENTS

| | | |
|---|---|---|
| WO | 03/107688 | 12/2003 |
| WO | 2006/088685 | 8/2006 |

OTHER PUBLICATIONS

Suzuki et al., "Chip-based Joint Processing Adaptive Array and Equalizer for DS-CDMA Packet Mobile Communication Systems," The Institute of Electronics, Information and Communication Engineers, Technical Report, vol. 102, No. 464, pp. 17-22 (Nov. 14, 2002).

Vrcelj et al., "Improvements in equalization of multiuser CDMA systems: oversampling and uniqueness," Conference Record of the $37^{th}$ Asilomar Conference on Signals, Systems and Computers, vol. 1, pp. 454-458 (Nov. 2003).

Lai, "On the Research of the Adaptive OFDM System with Adaptive Guard Interval Length and Modulation Scheme," Master's thesis of Zhejiang University, pp. 23-25 (Apr. 2004).

US 7,936,807 B2

METHOD AND APPARATUS FOR REDUCING THE PROCESSING RATE OF A CHIP-LEVEL EQUALIZATION RECEIVER

CROSS REFERENCE TO RELATED APPLICATION

This application is a continuation of U.S. patent application Ser. No. 11/824,792, filed Jul. 2, 2007, which is a continuation of U.S. patent application Ser. No. 11/515,169, filed Sep. 1, 2006, which issued as U.S. Pat. No. 7,257,152 on Aug. 14, 2007, which is a continuation of U.S. patent application Ser. No. 11/210,591 filed Aug. 24, 2005, which issued as U.S. Pat. No. 7,116,705 on Oct. 3, 2006, which in turn claims the benefit of U.S. Provisional Patent Application No. 60/625,870, filed Nov. 8, 2004, which is incorporated by reference as if fully set forth.

FIELD OF THE INVENTION

The present invention relates to a code division multiple access (CDMA) receiver. More particularly, the present invention relates to a method and apparatus for reducing the processing rate when performing chip-level equalization (CLE) in the CDMA receiver.

BACKGROUND

Chip-level equalizers are suitable candidates for CDMA receivers, such as those used in wireless transmit/receive units (WTRUs) and base stations. A normalized least mean square (NLMS)-based CLE receiver offers superior performance for high data rate services such as high speed downlink packet access (HSDPA) over a Rake receiver. A typical NLMS receiver consists of an equalizer filter and an NLMS algorithm. The equalizer filter is typically a finite impulse response (FIR) filter.

The NLMS algorithm is used as the tap coefficients generator. It generates appropriate tap coefficients used by the equalizer filter and updates them appropriately and iteratively in a timely basis. Typically, tap coefficients generation includes the error signal computation, vector norm calculation and leaky integration to generate and update the tap coefficients.

The high complexity of the CLE is due to the over-sampling processing in the CLE. A typical CLE includes equalizer filtering, tap-weight vector updating, vector norm square computing, or the like, which all operate at two or more times the chip rate. Two times the chip rate over-sampling processing induces twice as much complexity as the chip rate non-over-sampling processing in the equalizer filter.

SUMMARY

The present application is related to a method and apparatus for reducing the processing rate when performing CLE in a CDMA receiver which includes an equalizer filter. Signals received by at least one antenna of the receiver are sampled at M times the chip rate, where M is a positive integer. Each sample stream is split into M sample data streams at the chip rate. Multipath combining is preferably performed on each split sample data stream. The sample data streams are then combined into one combined sample data stream at the chip rate. The equalizer filter performs equalization on the combined sample stream at the chip rate. Filter coefficients are adjusted by adding a correction term to the filter coefficients utilized by the equalizer filter for a previous iteration.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Figure 1:
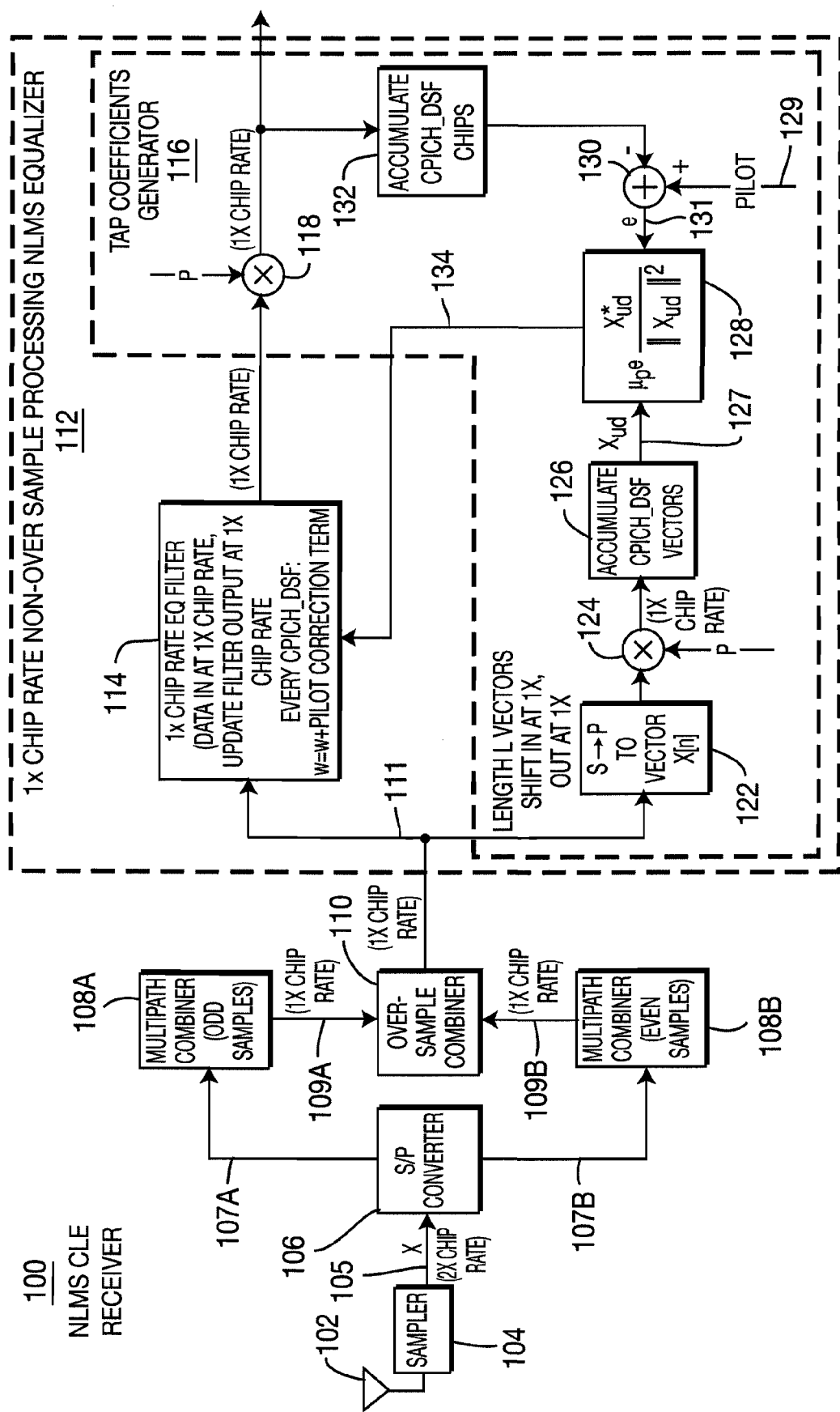
FIG. 1 is a block diagram of an exemplary CDMA receiver configured in accordance with a first embodiment.

The preferred embodiments will be described with reference to the drawing figures where like numerals represent like elements throughout.

Hereafter, the terminology "WTRU" includes but is not limited to a user equipment (UE), a mobile station, a laptop, a personal data assistant (PDA), a fixed or mobile subscriber unit, a pager, or any other type of device capable of operating in a wireless environment. When referred to hereafter, the terminology "base station" includes but is not limited to an access point (AP), a Node-B, a site controller or any other type of interfacing device in a wireless environment.

The features of the present invention may be incorporated into an integrated circuit (IC) or be configured in a circuit comprising a multitude of interconnecting components.

Hereafter, the present invention will be explained with reference to an NLMS algorithm. However, it should be noted that any type of adaptive equalization or filtering, such as least mean square (LMS), Griffith's algorithm, channel estimation based NLMS (CE-NLMS), and other iterative or recursive algorithms may be used.

FIG. 1 is a block diagram of an exemplary CDMA receiver 100 configured in accordance with a first embodiment. The CDMA receiver 100 includes at least one antenna 102, a sampler 104, a serial-to-parallel (S/P) converter 106, two multipath combiners 108A, 108B, an over-sample combiner 110 and a 1× chip rate non-over-sample processing NLMS equalizer 112. The NLMS equalizer 112 includes an equalizer filter 114 and a tap coefficients generator 116.

Signals are received by the antenna 102 and are sampled by the sampler 104 at twice the chip rate. The sampler 104 outputs a sample data stream 105, which is split into an odd sample data stream 107A and an even sample data stream 107B by the S/P converter 106. Therefore, the chip rate of signals output by the S/P converter 106 is one times (1×) the chip rate.

The even and odd sample data streams 107A, 107B are fed into respective ones of the multipath combiners 108A, 108B. Multipath is the signal spread in the time domain due to reflection of the signal from objects. The same signal may arrive at the receiver at different times (due to reflection), either early or late (depending on the reflection distances), and with different amplitudes and phases due to fading. The multipath combiners 108A, 108B collect and combine an original signal with their delayed spread signal (multipath signal or delayed replicates) to improve the reception quality.

Each of the sample data streams 107A, 107B has one sample stream and one or more delayed sample streams. The number of delayed sample data streams depends on the number of multipaths that the original signal experienced.

The multipath combiners 108A, 108B combine the multipath or delayed replicates of the signal data streams 107A, 107B. Maximum ratio combining (MRC) may be used for multipath combining. The multipath combined signal data streams 109A, 109B output by the respective multipath combiners 108A, 108B are then fed to an over-sample combiner 110.

The over-sample combiner 110 combines the multipath combined signal streams 109A, 109B and produces one combined sample data stream 111 at one times (1×) the chip rate. The combined sample stream 111 is fed into the equalizer filter 114 and the tap coefficients generator 116.

A matched filter (MF) may be used as the multipath combiners 108A, 108B and the over-sample combiner 110. The parameters $\vec{x}_n^{i,o}$, $\vec{x}_n^{i,e}$ and $H^{i,o}$, $H^{i,e}$ are denoted as a received signal vector and a channel response matrix for odd and even over-sampled sequences, respectively. The vector $\vec{x}_{n,co}$ is denoted as a combined signal vector after the multipath and over-sample combining. Assuming that a matched filter is used for multipath and over-sample combining, the combined signal can be expressed as follows:

$$\vec{x}_{n,co} = H^{1,o^H}\vec{x}_n^{1,o} + H^{1,e^H}\vec{x}_n^{1,e} + H^{2,o^H}\vec{x}_n^{2,o} + H^{2,e^H}\vec{x}_n^{2,e}.$$

Equation (1)

After the signal combining is performed, one improved signal stream 111 is formed and is fed to the equalizer filter 114 to perform equalization to remove interference such as inter-symbol interference (ISI) and multiple access interference (MAI). The equalizer filter 114 is preferably a finite impulse response (FIR) filter comprising a tap-delay line with tap coefficients of L taps. The NLMS equalizer 112 may be described in terms of weight updates as follows:

$$\vec{w}_{n+1,co} = \alpha \cdot \vec{w}_{n,co} + \mu \frac{\vec{x}_{n,co}^*}{|x_{n,co}|^2}(d[n] - \vec{x}_{n,co}^T \vec{w}_{n,co}),$$

Equation (2)

where $\vec{w}_{n,co}$ is the tap-weight vector and d[n] is the reference signal at time n.

The equalizer filter 114 operates at 1× chip rate and does not have over-sampling processing. Therefore, the number of taps of the equalizer filter 114 is smaller than that is required in a prior art equalizer filter with 2× chip rate processing. The equalizer filter 114 requires only half of the number of taps in the 2× chip rate equalizer filter.

The tap coefficients generator 116 includes multipliers 118, 124, an adder 130, a serial-to-parallel (S→P) to vector converter 122, a vector accumulator 126, a correction term generator 128 and a chips accumulator 132. The output from the equalizer filter 114 is descrambled via the multiplier 118. The output of the multiplier 118 is accumulated by the chips accumulator 132 for a predetermined period (e.g., for chips equal to a common pilot channel (CPICH) despreading factor). The accumulated result output by the chips accumulator 132 is subtracted from a reference pilot signal 129 via the adder 130 to generate an error signal 131, represented by a variable e, which is used by the correction term generator 128 to generate correction terms 134.

The combined input sample data stream 111 is converted to length L vectors by the S→P to vector converter 122 and descrambled by the multiplier 124. The descrambled input vectors are accumulated for a predetermined period, (e.g., for chips equal to a CPICH despreading factor) by the vectors accumulator 126 to generate update vectors 127. The update vectors 127 are forwarded to the correction term generator 128. To generate correction terms for tap coefficient updates, the inputs for $\mu_P$, e, $X_{ud}$ are required. $\mu_P$ is the step size. e is the error signal which is the differential signal between an equalized signal and a reference signal, which typically is used in the form of a pilot signal. $X_{ud}$ is the received signal after descrambling and despreading. $\|X_{ud}\|^2$ is the norm of the descrambled and despread signal $X_{ud}$. Equation (2) is used for iteration algorithm and tap coefficient updates.

The correction term generator 128 may generate the correction terms 134 based on the correction term $$\mu_P \cdot e \cdot \frac{X_{ud}^*}{\|X_{ud}\|^2}$$

which is added, in the equalizer filter 114, to the filter coefficients of the previous iteration to generate updated filter coefficients for the next iteration.

Alternatively, the correction term generator 128 may generate the correction terms 134 based on the correction term $$\mu_P \cdot e \cdot \frac{X_{ud}^*}{\|X_{ud}\|^2 + \eta}.$$

The variable η is a relatively small number that is used to improve the numerical properties and prevent the fixed-point computation from overflow when the correction term is generated.

Figure 2:
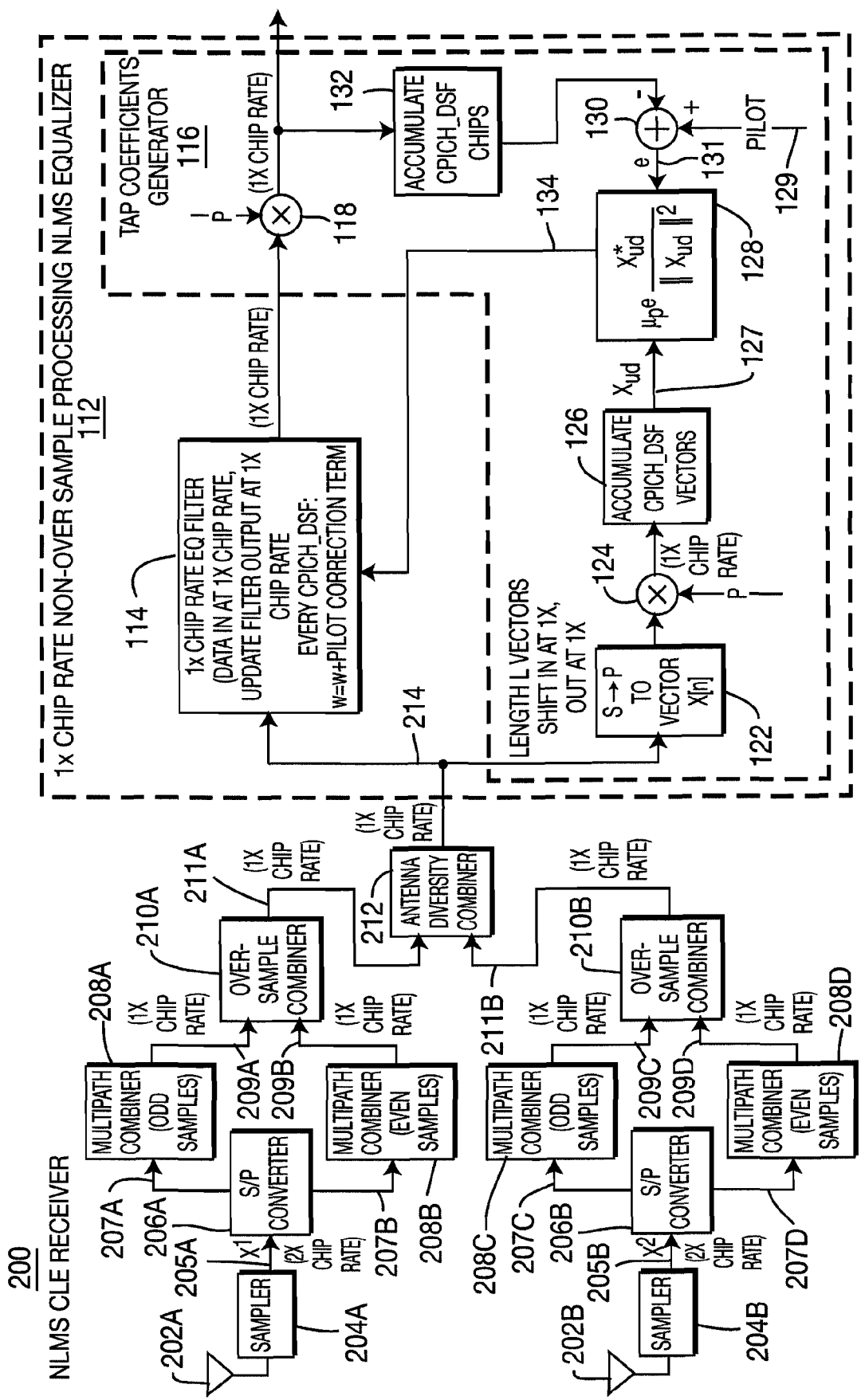
FIG. 2 is a block diagram of an exemplary CDMA receiver configured in accordance with a second embodiment.

FIG. 2 is a block diagram of an exemplary CDMA receiver 200 configured in accordance with a second embodiment. The CDMA receiver 200 includes two antennas 202A, 202B, two samplers 204A, 204B, two S/P converters 206A, 206B, four multipath combiners 208A, 208B, 208C, 208D, two over-sample combiners 210A, 210B, an antenna diversity combiner 212 and the 1× chip rate non-over-sample processing NLMS equalizer 112 described above with respect to FIG. 1.

Signals are received by the antennas 202A, 202B and are respectively sampled by the samplers 204A, 204B at twice (2×) the chip rate. The sampler 204A outputs a sample data stream 205A, which is split into an odd sample data stream 207A and an even sample data stream 207B by the S/P converter 206A at one times (1×) the chip rate. The sampler 204B outputs a sample data stream 205B, which is split into an odd sample data stream 207C and an even sample data stream 207D by the S/P converter 206B at one times (1×) the chip rate.

The odd sample data stream 207A and the even sample data stream 207B are fed into respective ones of the multipath combiners 208A, 208B. The multipath combiners 208A, 208B respectively combine the multipath or delayed replicates of the signal data streams 207A, 207B. Maximum ratio combining (MRC) may be used for multipath combining. The multipath combined signal data streams 209A, 209B are output by the respective multipath combiners 208A, 208B at one times (1×) the chip rate and are then fed to an over-sample combiner 210A. The over-sample combiner 210A combines the multipath combined signal streams 209A, 209B and produces a first combined sample data stream 211A at one times (1×) the chip rate.

The odd sample data stream 207C and the even sample data stream 207D are fed into respective ones of the multipath combiners 208C, 208D. The multipath combiners 208C, 208D respectively combine the multipath or delayed replicates of the signal data streams 207C, 207D. MRC may be used for multipath combining. The multipath combined signal data streams 209C, 209D are output by the respective multipath combiners 208C, 208D at one times (1×) the chip rate and are then fed to an over-sample combiner 210B. The over-sample combiner 210B combines the multipath combined signal streams 209C, 209D and produces a second combined sample data stream 211B at one times (1×) the chip rate.

The combined sample data streams 211A and 211B are combined by the antenna diversity combiner 212, and the combined output 214 of the antenna diversity combiner 212 is fed into the equalizer filter 114 and the tap coefficients generator 116 of the 1× chip rate non-over-sample processing NLMS equalizer 112.

Figure 3A:
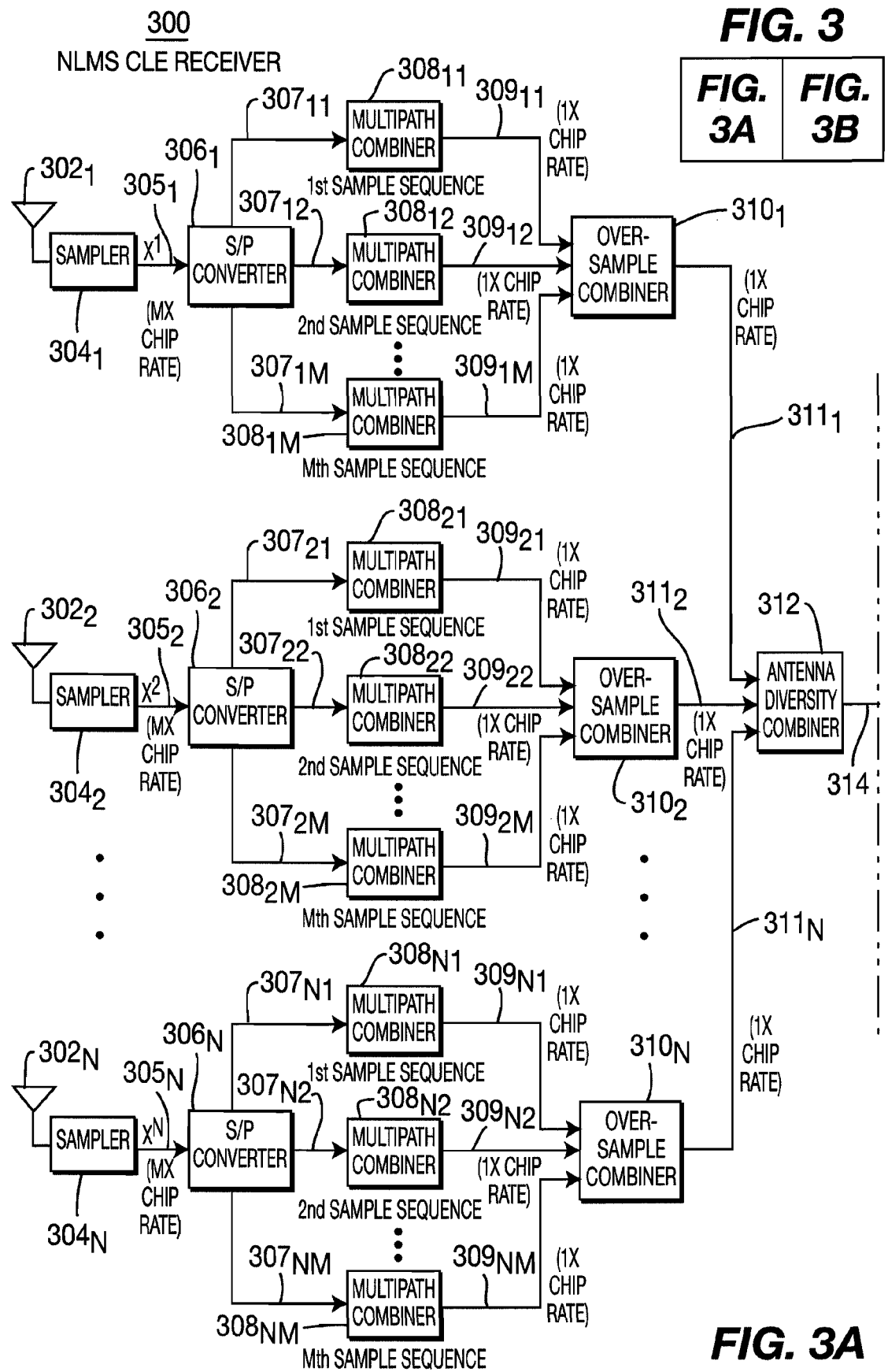
FIGS. 3A and 3B, taken together, are a block diagram of an exemplary CDMA receiver configured in accordance with a third embodiment.
Figure 3B:
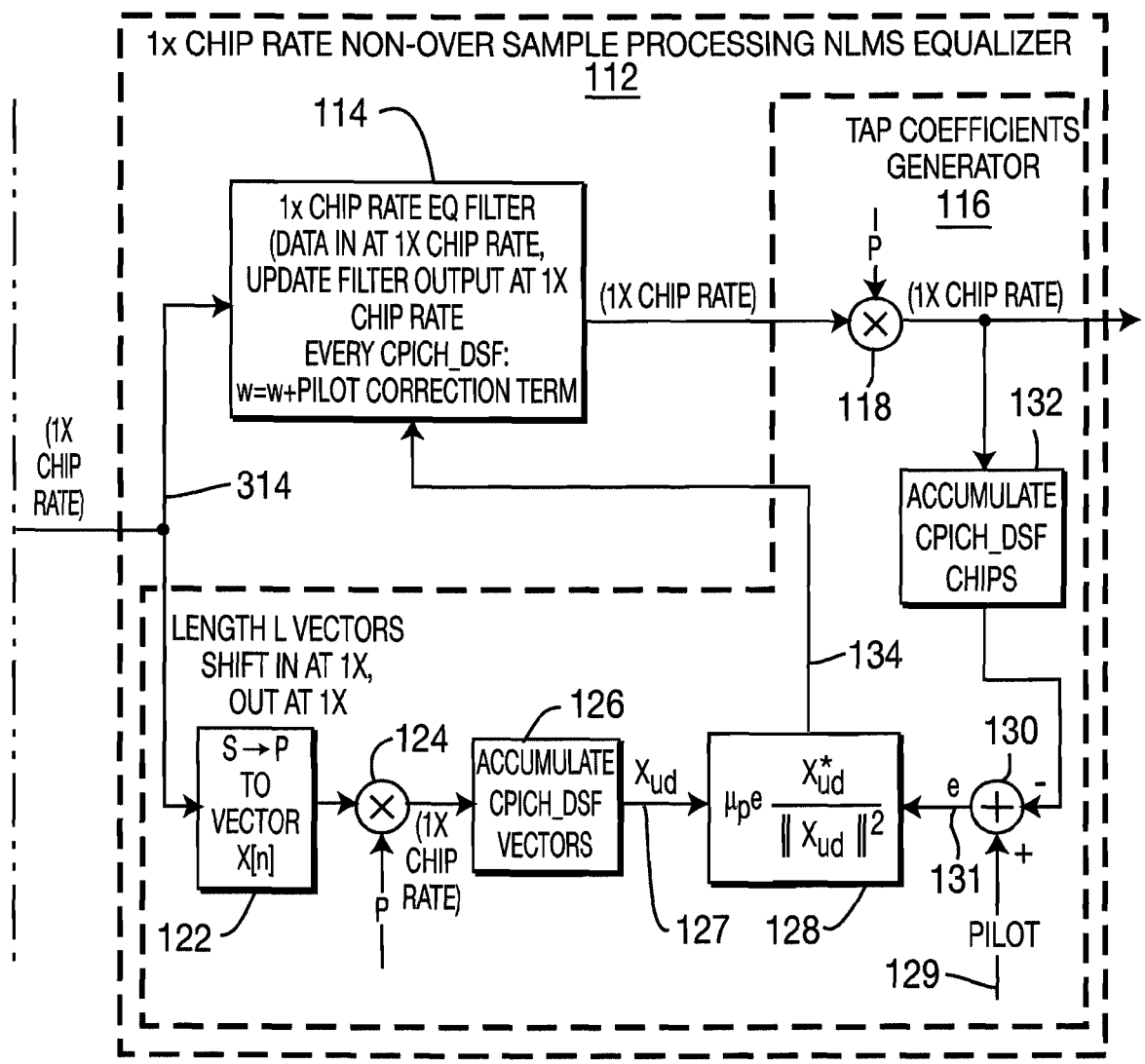

FIGS. 3A and 3B, taken together, are a block diagram of an exemplary CDMA receiver 300 configured in accordance with a third embodiment. The third embodiment is an extension of the first and second embodiments to N antennas and M× oversampling, where N and M are positive integers. The CDMA receiver 300 includes N antennas $302_1$-$302_N$, N samplers $304_1$-$304_N$, N S/P converters $306_1$-$306_N$ (i.e., splitters), N×M multipath combiners $308_{11}$-$308_{NM}$, N over-sample combiners $310_1$-$310_N$, an antenna diversity combiner 312 and the 1× chip rate non-over-sample processing NLMS equalizer 112 described above with respect to FIG. 1.

Signals are received by the antennas $302_1$-$302_N$ and are respectively sampled by the samplers $304_1$-$304_N$ at M times (M×) the chip rate (i.e., $1^{st}$ sample sequence, $2^{nd}$ sample sequence, . . . , the Mth sample sequence).

In response to receiving a signal from the antenna $302_1$, the sampler $304_1$ generates a sample data stream $305_1$ which is split into M sample sequences $307_{11}$-$307_{1M}$ by the S/P converter $306_1$ (i.e., a splitter) at one times (1×) the chip rate. The multipath components of each respective M sample sequence $307_{11}$-$307_{1M}$ are combined by a respective one of the multipath combiners $308_{11}$-$308_{1M}$ which generates a respective over-sampled stream $309_{11}$-$309_{1M}$ that is fed to the over-sample combiner $310_1$. The over-sample combiner $310_1$ combines the over-sampled streams $309_{11}$-$309_{1M}$ into a combined over-sampled stream $311_1$ which is then fed to the antenna diversity combiner 312.

In response to receiving a signal from the antenna $302_2$, the sampler $304_2$ generates a sample data stream $305_2$ which is split into M sample sequences $307_{21}$-$307_{2M}$ by the S/P converter $306_2$ (i.e., a splitter) at one times (1×) the chip rate. All multipath components of each respective M sample sequence $307_{21}$-$307_{2M}$ are combined by a respective one of the multipath combiners $308_{21}$-$308_{2M}$ which generates a respective over-sampled stream $309_{21}$-$309_{2M}$ that is fed to the over-sample combiner $310_2$. The over-sample combiner $310_2$ combines the over-sampled streams $309_{21}$-$309_{2M}$ into a combined over-sampled stream $311_2$ which is fed to the antenna diversity combiner 312.

In response to receiving a signal from the antenna $302_N$, the sampler $304_N$ generates a sample data stream $305_N$ which is split into M sample sequences $307_{N1}$-$307_{NM}$ by the S/P converter $306_N$ (i.e., a splitter) at one times (1×) the chip rate. All multipath components of each respective M sample sequence $307_{N1}$-$307_{NM}$ are combined by a respective one of the multipath combiners $308_{N1}$-$308_{NM}$ which generates a respective over-sampled stream $309_{N1}$-$309_{NM}$ that is fed to the over-sample combiner $310_N$. The over-sample combiner $310_N$ combines the over-sampled streams $309_{N1}$-$309_{NM}$ into a combined over-sampled stream $311_N$ which is then fed to the antenna diversity combiner 312.

The antenna diversity combiner 312 combines the combined over-sampled streams $311_1$-$311_N$ into an antenna diversity sample data stream 314 at chip rate. The antenna diversity sample data stream 314 is input to the equalizer filter 114 and the taps coefficients generator 116 of the 1× chip rate non-over-sample processing NLMS equalizer 112.

The foregoing description is related to a despread pilot-directed receiver. As an alternative, the receiver may be a non-despread pilot-directed receiver. In such case, no accumulation of the descrambled samples is performed.

Figure 4:
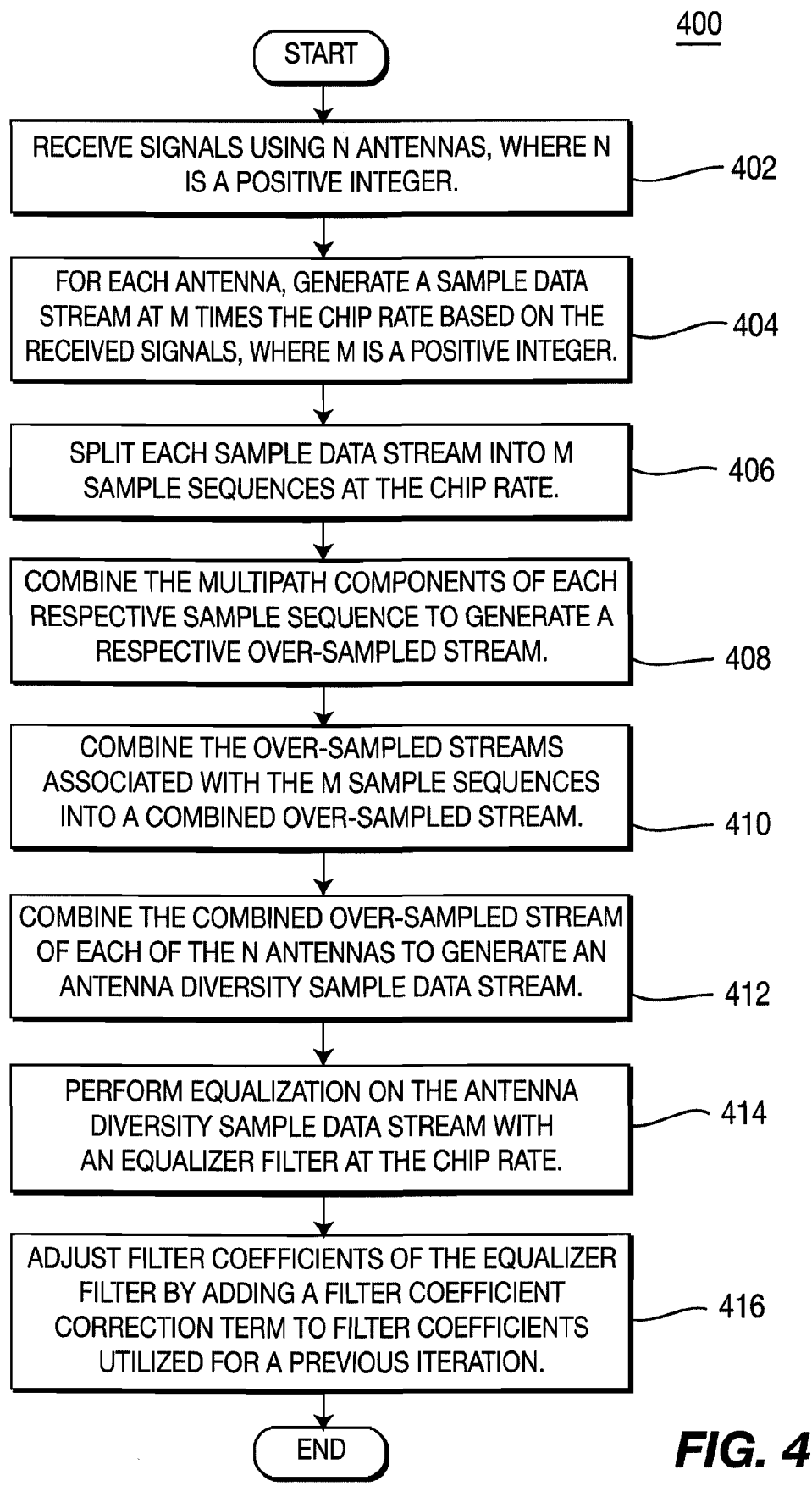
FIG. 4 is a flow diagram of a process for implementing non-over-sampling processing in a CDMA receiver.

FIG. 4 is a flow diagram of a process 400 including method steps for implementing non-over-sampling processing. In step 402, signals are received using N antennas $302_1$-$302_N$, where N is a positive integer. In step 404, a sample data stream $305_1$-$305_N$ is generated for each of the N antennas $302_1$-$302_N$ at M times the chip rate based on the received signals, where M is a positive integer. In step 406, each sample data stream $305_1$-$305_N$ is split into M sample sequences $307_{11}$-$307_{1M}$, $307_{21}$-$307_{2M}$, $307_{N1}$-$307_{NM}$ at the chip rate. In step 408, the multipath components of each respective sample sequence $307_{11}$-$307_{1M}$, $307_{21}$-$305_{2M}$, $307_{N1}$-$305_{NM}$ are combined to generate a respective over-sampled stream $309_{11}$-$309_{1M}$, $309_{21}$-$309_{2M}$, $309_{N1}$-$309_{NM}$. In step 410, the over-sampled streams $309_{11}$-$309_{1M}$, $309_{21}$-$309_{2M}$, $309_{N1}$-$309_{NM}$ associated with the sample sequences $307_{11}$-$307_{1M}$, $307_{21}$-$307_{2M}$, $307_{N1}$-$307_{NM}$ are combined to generate a combined over-sampled stream $311_1$-$311_N$. In step 412, the combined over-sampled streams $311_1$-$311_N$ of the N antennas are combined to generate an antenna diversity sample data stream 314. In step 414, equalization is performed on the antenna diversity sample data stream 314 with an equalizer filter 114 at the chip rate. In step 416, filter coefficients of the equalizer filter are adjusted by adding a filter coefficient correction term 134 to the filter coefficients utilized for a previous iteration. The filter coefficient correction term 134 is generated in accordance with an error signal 131 which is generated by comparing an output from the equalizer filter with a reference signal.

While the present invention has been described in terms of the preferred embodiment, other variations which are within the scope of the invention as outlined in the claims below will be apparent to those skilled in the art.

What is claimed is:
1. A wireless transmit/receive unit (WTRU), comprising:
a first antenna configured to receive first signals;
a second antenna configured to receive second signals;
a first sampler configured to sample the first received signals at twice a chip rate and output a first data stream;
a second sampler configured to sample the second received signals at twice a chip rate and output a second data stream;
a first serial-to-parallel (S/P) converter configured to split the first data stream into a first odd data stream and a first even data stream;
a second S/P converter configured to split the second data stream into a second odd data stream and a second even data stream;
a first multipath combiner configured to combine a multipath of the first odd data stream to generate a first multipath combined odd signal stream;
a second multipath combiner configured to combine the multipath of the first even data stream to generate a first multipath combined even signal stream;

a third multipath combiner configured to combine the multipath of the second odd data stream to generate a second multipath combined odd signal stream;
a fourth multipath combiner configured to combine the multipath of the second even data stream to generate a second multipath combined even signal stream;
a first over-sample combiner configured to combine the first multipath combined odd signal stream and the first multipath combined even signal stream to produce a first combined sample data stream;
a second over-sample combiner configured to combine the second multipath combined odd signal stream and the second multipath combined even signal stream to produce a second combined sample data stream; and
an antenna diversity combiner configured to combine the first combined sample data stream and the second combined sample data stream to produce a combined output.

2. The WTRU of claim 1, further comprising:
a one times chip rate non-over-sample processing normalized least mean square (NLMS) equalizer configured to equalize the combined output.

3. A wireless transmit/receive unit (WTRU), comprising:
a plurality of antennas configured to receive signals;
a plurality of samplers configured to sample the received signals at twice a chip rate and output a plurality of sample data streams;
a plurality of serial-to-parallel (S/P) converters configured to split the plurality of sample data streams into a plurality of odd and even data streams;
a first plurality of multipath combiners configured to combine a multipath of each odd data stream to generate a plurality of multipath combined odd signal streams;
a second plurality of multipath combiners configured to combine the multipath of each even data stream to generate a plurality of multipath combined even signal streams;
a plurality of over-sample combiners configured to combine the plurality of multipath combined odd signal streams and the plurality of multipath combined even signal streams to produce a plurality of combined sample data streams; and
an antenna diversity combiner configured to combine the plurality of combined sample data streams to produce a combined output.

4. The WTRU of claim 3, wherein the plurality of antennas is two.

5. The WTRU of claim 3, wherein the plurality of samplers is two.

6. The WTRU of claim 3, wherein the plurality of S/P converters is two.

7. The WTRU of claim 3, wherein the first plurality of multipath combiners and the second plurality of multipath combiners is equal to two.

8. The WTRU of claim 3, wherein the plurality of over-sample combiners is two.

9. The WTRU of claim 3, further comprising:
a one times chip rate non-over-sample processing normalized least mean square (NLMS) equalizer configured to equalize the combined output.

* * * * *